United States Patent [19]

Kopp

[11] Patent Number: 4,808,869
[45] Date of Patent: Feb. 28, 1989

[54] INTEGRAL MAGNETIC TORQUE LIMITING COUPLING/MOTOR

[75] Inventor: Norman L. Kopp, Caledonia, Ill.
[73] Assignee: Sundstrand Corp., Rockford, Ill.
[21] Appl. No.: 122,344
[22] Filed: Nov. 18, 1987
[51] Int. Cl.[4] .................. H02K 49/10; F16D 7/00
[52] U.S. Cl. .................. 310/78; 192/84 PM; 310/103
[58] Field of Search .................. 192/56 R, 84 PM; 310/41, 78, 96, 97, 98, 99, 103, 104, 105, 108, 109, 46, 75 D, 76

[56] References Cited

U.S. PATENT DOCUMENTS

| | | | |
|---|---|---|---|
| 3,320,448 | 2/1964 | Turk | 310/98 |
| 4,237,703 | 12/1980 | Wahl, Jr. | 192/84 PM |
| 4,381,466 | 4/1983 | Laenens | 310/103 |
| 4,486,176 | 12/1984 | Tardieu et al. | 310/47 |
| 4,588,913 | 5/1986 | Adami | 310/78 |

FOREIGN PATENT DOCUMENTS 1015119 9/1957 Fed. Rep. of Germany ........ 310/98

Primary Examiner—Patrick P. Salce
Assistant Examiner—D. L. Rebsch
Attorney, Agent, or Firm—Antonelli, Terry & Wands

[57] ABSTRACT

A motor with an integral magnetic torque limiting coupling which maintains the relative positions of the motor rotor and a coupling output shaft thereof when the rotor is rotated, and transmits up to a predetermined amount of torque during such rotation, which exceeds the maximum sustained torque which the motor develops during normal operation so as not to interfere with the torque transmission during normal operation of the motor while allowing the output shaft and rotor to slip relative to one another to prevent transmitting a torque above a maximum safe torque which may be safely applied to a gear train to be driven by the motor, thereby preventing damage to the gear train by the motor in the event of a sudden change of speed of the gear train. The rotor of the motor is rotatably supported by bearings in the motor on journal extensions located beyond the ends of the rotor, so as to enable the magnetic coupling to have a length comparable to that of the rotor, in order to readily attain the necessary magnetic strength of the coupling.

17 Claims, 1 Drawing Sheet

INTEGRAL MAGNETIC TORQUE LIMITING COUPLING/MOTOR

BACKGROUND AND SUMMARY OF THE INVENTION

The present invention is directed to an apparatus for isolating momentum of a motor from a drive means through which the motor drives a movable load to prevent the motor from damaging the drive means when there is a sudden change in speed of the movable load and the drive means. More particularly, the invention is directed to a motor which is formed integrally with a magnetic torque limiting coupling for protecting a drive means, such as a gear train normally driven by the motor, in the event of a sudden change in speed of the drive means.

When a motor is used to drive a movable device, such as an actuator, through a gear train, a sudden change in speed of the movable device as by jamming, for example, can result in significant damage to the gear train if the inertia or momentum of the motor's rotor is high enough such that it attempts to continue to rotate the gear train and movable device after they have been stopped. In the past, to solve this problem various different types of non-magnetic slip clutches have been developed and implemented in drive shafts between the motor and gear train.

An object of the present invention is to provide a novel solution to this problem, so as to prevent damage to the gear train or other drive means when the movable object is suddenly stopped, but the inertia of the motor causes it to continue to rotate. More particularly, an object of the present invention is to provide an improved apparatus for isolating momentum of a motor from a drive means through which the motor drives a movable load, to prevent the motor from damaging the drive means when there is a sudden change in speed of the movable load and the drive means.

An additional object of the invention is to provide an apparatus of the aforementioned type which is formed integrally with a motor which will operate normally, at least through its maximum operating torque, but which will protect the associated gear train or other drive means from damage in the event of a sudden change of speed of the load and/or the drive means. By integrating the drive means protection apparatus and the motor a smaller, lighter, low inertia and/low cost combination results.

These and other objects are attained by an apparatus according to the invention for isolating momentum of a motor from a drive means through which the motor drives a movable load to prevent the motor from damaging the drive means when there is a sudden change in speed of the movable load and drive means, causing a torque on the drive means above a maximum torque which may be safely applied to the drive means. The apparatus comprises a magnetic torque limiting coupling for transferring torque between the motor and the drive means. The magnetic torque limiting coupling has a magnetic strength which exceeds the maximum sustained torque which the motor develops during normal operation but which permits slippage to occur in the coupling in the drive between the motor and the drive means, to prevent a torque above the maximum safe torque from being applied to the drive means by the motor to thereby protect the drive means from damage by the motor in the event of a sudden change in speed of the movable load and the drive means.

According to a disclosed, preferred embodiment of the invention, the magnetic torque limiting coupling is formed integrally with a motor having a stator assembly, and a rotor and an output shaft concentrically disposed within a bore in the stator assembly. The magnetic torque limiting coupling operates to maintain the relative positions of the rotor and output shaft when the rotor is rotated, and transmits up to a predetermined amount of torque between the rotor and output shaft. The coupling is also operative to allow the output shaft and rotor to slip relative to one another when the torque demand exceeds the predetermined amount of torque. According to the invention, the predetermined amount of torque of the coupling exceeds the maximum sustained torque which the motor develops during normal operation but is less than or equal to a maximum safe torque which may be applied to a drive means to be driven by the motor to thereby prevent momentum of the motor from damaging the drive means, such as a gear train, coupled to the output shaft of the motor in the event of a sudden change of speed of the drive means.

A motor having an integral magnetic torque limiting coupling is known from U.S. Pat. No. 3,320,448. However, the coupling in such a motor allows slippage to occur at a torque limit which interrupts the normal operation of the motor, to avoid generating a great deal of heat, which may either cause damage to the winding of the motor or burn the motor out. Magnetic couplings are also shown in U.S. Pat. Nos. 4,381,466 and 4,486,176.

The disclosed coupling of the invention comprises first and second rotatable members which are located in spaced relationship and rotatably coupled to one another by magnetic means. The first and second members are arranged in telescoped relation with a plurality of permanent magnets being arranged on each of the members, with the magnets on one member being in opposed, spaced relationship to the magnets on the other member for magnetically coupling the members together to maintain their relative positions during rotation, and to transmit torque through the coupling.

The first member of the coupling is a hollow motor output shaft of the motor. The second member is a coupling output shaft of the motor and is telescoped within the second member. The hollow output shaft of the motor is rotatably connected with the motor rotor. The drive means in the disclosed embodiment includes a gear train which is protected from damage according to the invention.

According to a further feature of the invention the rotor of the motor is supported for rotation by journal extensions which extend outwardly beyond each end of the rotor for cooperation with bearing means of the motor, whereby the length of the magnetic coupling can be the same or substantially the same as the rotor to attain the necessary magnetic strength. The journal extensions are formed on the ends of the hollow motor output shaft of the motor in the disclosed embodiment.

These and other objects, features and advantages of the present invention will become more apparent from the following description when taken in connection with the accompanying drawings, which show, for purposes of illustration only, one preferred embodiment in accordance with the present invention.

DETAILED DESCRIPTION OF THE INVENTION

Figure 1:
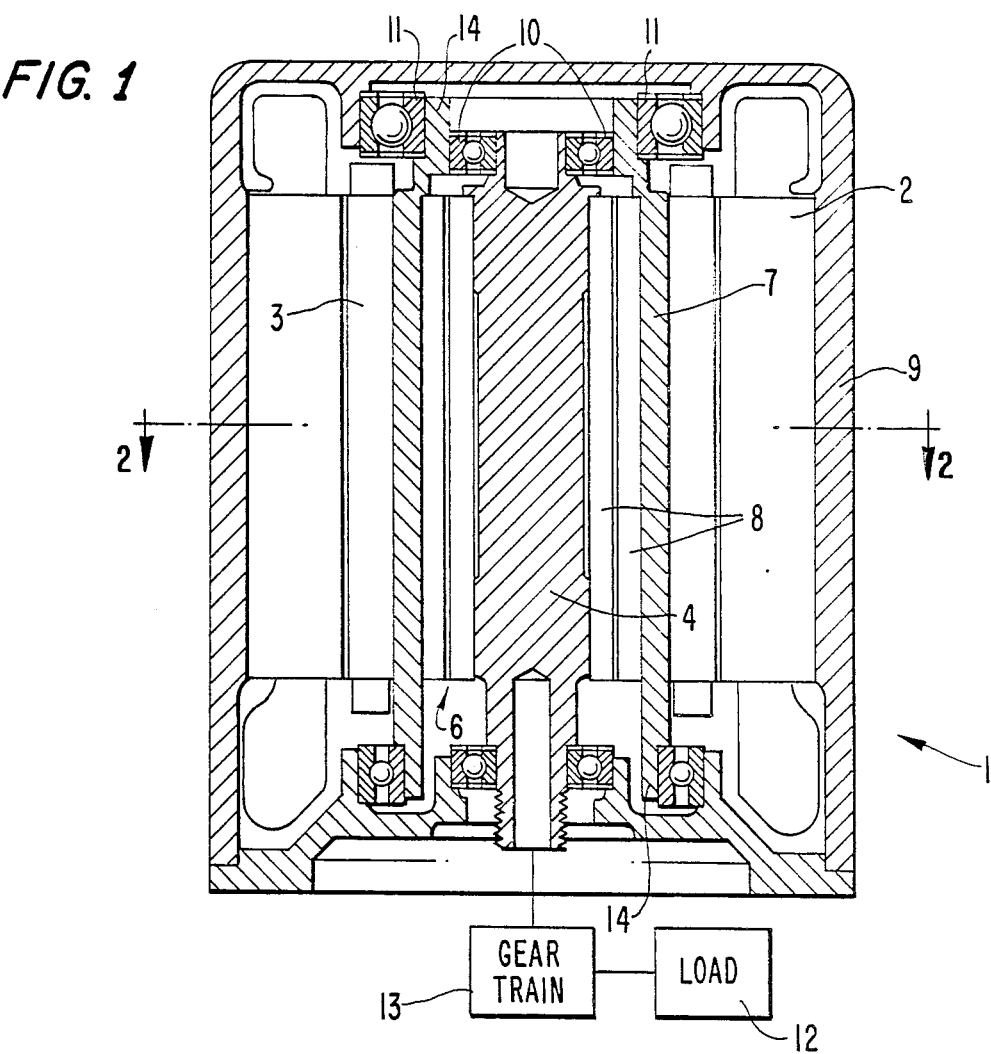
FIG. 1 is a cross-sectional view taken along the rotational axis of an electric motor of the invention whose output shaft is illustrated schematically as being connected for driving a load through a gear train.

Referring now to the drawings, a motor 1 of the invention is an electric motor which comprises a stator assembly 2, and a rotor 3 and a coupling output shaft 4 concentrically disposed within a bore 5 in the stator assembly for transferring torque between the rotor 3 of the motor and the coupling output shaft 4 thereof. A magnetic torque limiting coupling 6 is provided between the coupling output shaft 4 and the rotor 3. More particularly, the coupling output shaft 4 and a motor output shaft 7 of the rotor 3 are arranged in telescoped relation with a plurality of permanent magnets 8 being arranged on each of the shafts 4 and 7. The magnets on one shaft are in opposed, spaced relationship to the magnets on the other shaft for magnetically coupling the members together to maintain the relative positions of the rotor 3 and shaft 4 with rotation of said rotor and transmit torque through the coupling.

Both the coupling output shaft 4 and the motor rotor 3 via its associated motor output shaft 7 are supported for rotation within the motor housing 9 by bearings 10 and 11, respectively. The bearings 11 rotatably supporting the rotor 3 and its associated motor output shaft 7 engage journal extensions 14 on the ends of the shaft 7 located outwardly from the ends of the rotor 3. This arrangement is particularly advantageous in that it permits the magnets 8 to have a length equal to or substantially equal to the axial length of the rotor 3 for achieving the necessary magnetic strength of the coupling.

Figure 2:
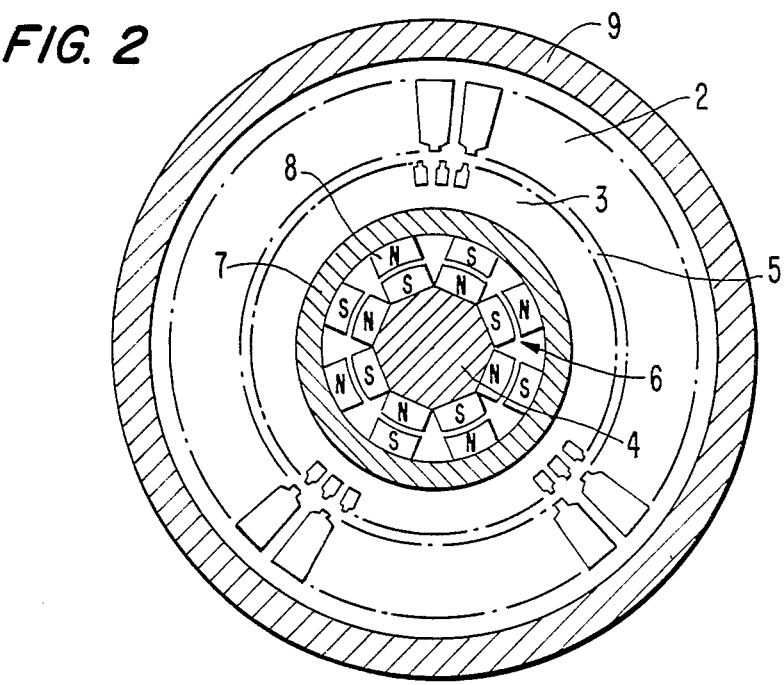
FIG. 2 is a cross-sectional view of the motor of FIG. 1 taken along the line 2—2.

As shown in FIG. 2, the plurality of magnets 8 are arranged on the inside surface of the hollow motor output shaft 7 and on the opposed outer surface of the coupling output shaft 4. These magnets are secured on each surface as by bonding or using mechanical fasteners. The number of magnets disposed on the coupling output shaft corresponds to the number of magnets disposed on the inner surface of the motor output shaft and is preferably an even number. The poles of the magnets on each surface have north and south poles alternately disposed. As a result of this arrangement, as the motor output shaft 7 begins to rotate, the magnets 8 of the coupling output shaft 4 will be appropriately attracted to and repelled by the magnets 8 that are attached to the motor output shaft 7 of the rotor 3. This will induce a rotation of the coupling output shaft 4. In other words, as any specific magnet, which is connected to the motor output shaft 7, rotates about the center of rotation, it will tend to attract the oppositely poled magnets of the coupling output shaft 6 and will also tend to repel a similarly poled magnet. For example, when the motor is at rest, a specific south pole magnet on the shaft 7 of the rotor 3 will be disposed opposite a north pole magnet that is connected to the coupling output shaft 4. As the motor output shaft 7 begins to rotate, this south pole magnet will attract or pull its associated north pole magnet of the coupling output shaft 4 and begin to induce rotation of the coupling output shaft 4. Similarly, that same south pole magnet of the motor output shaft 7 will tend to repel the next south pole magnet of the coupling output shaft 4 if it begins to move appreciably away from the north pole magnet that it is pulling with it. This combination of forces, which will be experienced by all of the magnets on both the motor output shaft 7 and the coupling output shaft 4, will induce rotation in the coupling output shaft 4 when the motor output shaft begins to rotate while maintaining the relative positions of the rotor 3 and output shaft 4 when the rotor is rotated.

When the motor output shaft attains full speed, the coupling output shaft 4 will rotate at the same speed unless some external resistance provides a significant drag on the coupling output shaft. If a movable device, such as an actuator, represented by the load 12 shown schematically in FIG. 1, which is being driven by the motor 1 experiences a sudden drag, such as a jam condition, the coupling output shaft 4 will tend to slow significantly or, in a worse case condition, stop completely. If this occurs before the motor can be de-energized, the attracting and repelling forces of the magnets 8 described above will be overcome and the motor output shaft 7 will continue to rotate because of its inertia or momentum even when the coupling output shaft 4 has been stopped. Although the motor output shaft 7 will experience alternating positive and negative torques during this type of slippage sequence because of the inner action of the magnets 8, significant damage to the drive means 13 intermediate the motor 1 and the load 13, a gear train as shown schematically in FIG. 1, will be avoided as the motor continues to rotate even after the coupling output shaft 4 is stopped.

The magnetic strength of the magnetic torque limiting coupling 6 is selected so that it exceeds the maximum sustained torque which the electric motor 1 develops during normal operation, but permits slippage to occur in the coupling before the torque exceeds the maximum safe torque which can be applied to the gear train 13. This prevents damage to the gear train by the motion in the event of a sudden change in speed of the movable load 12 and the drive means 13 being driven by the motor. This selection of the magnetic strength, that is the predetermined amount of torque which will be transmitted by the coupling before slippage, is a function of a number of different factors including the number of magnets or magnetic poles, the spacing or air gap between the opposed magnetic poles secured to the shafts 4 and 7, the axial length of the magnets, the mean torque arm and the particular magnetic material from which the magnets are made. In the case of a synchronous electric motor, the predetermined amount of torque is selected to exceed the pull-out torque of the motor. For an induction type motor, the predetermined amount of torque exceeds the breakdown torque of the motor. In either case, it can be seen that the magnetic strength of the coupling is selected so as to exceed the maximum sustained torque which the motor develops during normal operation while permitting slippage to occur in the coupling, that is, between the output shaft and the rotor at a torque above the predetermined amount of torque in the event of a sudden stoppage of the drive means and output shaft to thereby prevent the momentum of the motor from damaging a drive means such as a gear train coupled to the output shaft of the motor.

While I have shown and described only one embodiment in accordance with the present invention, it is understood that the same is not limited thereto, but is susceptible to numerous changes and modifications as known to those skilled in the art. For example, the apparatus for isolating the momentum of the motor from a drive means through which the motor drives a movable load could be provided independent of the motor by having a separate connecting shaft between an independent motor and an independent magnetic coupling. The torque limiting coupling of the invention could be provided in this shaft outside the motor. However, by integrating the coupling with the motor as in the disclosed preferred embodiment of the invention, the motor output shaft serves as the input shaft to the magnetic coupling. This combination produces a smaller, lighter, lower inertia and less costly assembly than if they were separate. Also, the advantages of integration of the apparatus of the invention can be applied to a generator/magnetic coupling. In such a case, the potentially damaging torque produced by decelerating the generator's rotor is avoided. The invention could also be integrated in different types of motors including hydraulic motors, as well as both AC and DC motors. Therefore, I do not wish to be limited to the details shown and described herein, but intend to cover all such changes and modifications s are encompassed by the scope of the appended claims.

I claim:

1. An apparatus for isolating momentum of a motor from a drive means through which the motor drives a movable load to prevent the motor from damaging the drive means when there is a sudden change in speed of the movable load and drive means causing a torque on the drive means above a maximum torque which may be safely applied to the drive means, said apparatus comprising a magnetic torque limiting coupling for transferring torque between said motor and said drive means having first and second rotatable members for driving connection with said motor and said drive means, respectively, said first and second members being located in spaced relationship and rotatably coupled to one another by magnetic means, said magnetic means having a magnetic strength which exceeds the maximum sustained torque which said motor develops during normal operation so as to transfer torque without interruption during normal operation of the motor but which permits slippage to occur between said first and second members of said coupling to prevent a torque above said maximum safe torque from being applied to said drive means by said motor to thereby protect the drive means from being damaged by the motor in the event of a sudden change of speed of the movable load and the drive means.

2. The apparatus according to claim 1, wherein said first and second members are arranged in telescoped relation and said magnetic means comprises a plurality of permanent magnets arranged on each of said first and second members with the magnetic poles of said permanent magnets on one member being in opposed, spaced relationship to the magnetic poles of the permanent magnets on the other member for magnetically coupling said members together to transmit torque through said coupling.

3. The apparatus according to claim 1, wherein said magnetic torque coupling is formed integrally with said motor.

4. The apparatus according to claim 3, wherein said first member of said coupling is a hollow motor output shaft of said motor within which a coupling output shaft of said motor is telescoped as said second member.

5. The apparatus according to claim 4, wherein said motor output shaft is rotatably connected with the motor rotor.

6. The apparatus according to claim 5, wherein said motor output shaft and rotor are rotatably supported in said motor on bearing means which engage journal extensions provided on said motor output shaft so as to extend outwardly beyond each end of the rotor whereby the length of said permanent magnets of the magnetic torque limiting coupling can be the same or substantially the same as said motor to attain said magnetic strength thereof.

7. The apparatus according to claim 1, wherein said drive means includes a gear train.

8. In a motor comprising a stator assembly, a rotor and an output shaft concentrically disposed within a bore in said stator assembly, and torque limiting means operative to maintain the relative positions of said rotor and said output shaft and transmit a predetermined amount of torque between said rotor and output shaft while allowing said output shaft and rotor to slip relative to one another when said torque exceeds said predetermined amount of torque, the improvement comprising said predetermined amount of torque of said torque limiting means exceeding the maximum sustained torque which said motor develops during normal operations so as to transfer torque without interruption during normal operation of the motor, but permitting slippage to occur between said output shaft and said rotor at a torque above a maximum safe torque which can be safely applied to a drive means driven by said motor whereby damage to said drive means by said motor in the event of a sudden change in speed of the drive means can be prevented.

9. The motor according to claim 8, wherein said motor is a synchronous electric motor and said predetermined amount of torque exceeds the pull-out torque of said motor.

10. The electric motor according to claim 8, wherein said torque limiting means is a magnetic torque limiting coupling comprising first and second rotatable members which are located in spaced relationship and rotatably coupled to one another by magnetic means.

11. The motor according to claim 8, wherein said first and second members are arranged in telescoped relationship to one another with a plurality of permanent magnets having magnetic poles being arranged on each of said members with the magnetic poles on one member being in opposed, spaced relationship to the magnetic poles on the other member for magnetically coupling said members together to transmit torque through said coupling.

12. The motor according to claim 11, wherein said first member of said coupling is a hollow motor output shaft of said motor within which a coupling output shaft of said motor is telescoped as said second member.

13. The motor according to claim 12, wherein said motor output shaft is rotatably connected with the motor rotor.

14. The motor according to claim wherein said rotor is supported on journal extensions extending outwardly beyond the ends of said rotor for cooperation with bearing means for rotatably supporting said rotor whereby the length of the permanent magnets of said torque limiting means can be the same or substantially the same as said rotor.

15. A motor comprising a stator assembly, a rotor and a coupling output shaft concentrically disposed within a bore in the stator assembly, and a magnetic torque limiting coupling operative to maintain the relative position of said rotor and said output shaft for transmitting torque between said rotor and output shaft, said magnetic torque limiting coupling having a magnetic strength which exceeds the maximum sustained torque which the motor develops during normal operation so as to transfer torque without interruption during normal operation of the motor, but which permits slippage to occur between said rotor and said output shaft to prevent a torque above a maximum safe torque which can be safely applied to a drive means to be driven by said motor to thereby protect said drive means from being damaged by said motor in the event of a sudden change in speed of said drive means, and wherein said rotor is supported for rotation by journal extensions extending outwardly beyond each end of the rotor for cooperation with bearing means of said motor whereby the length of said magnetic torque coupling can be the same or substantially the same as said rotor to attain said magnetic strength thereof.

16. The motor according to claim 15, wherein said rotor is carried by a motor output shaft which is magnetically coupled to said coupling output shaft for rotation therewith by said magnetic torque coupling, said journal extensions being provided on the respective ends of said motor output shaft.

17. In combination, a motor, a movable load adapted to be driven by said motor, drive means through which the motor drives the movable load, and a magnetic torque limiting coupling for transferring torque between said motor and said drive means, said magnetic torque limiting coupling having first and second rotatable members drivingly connected with said motor and said drive means, respectively, said first and second members being located in spaced relationship and rotatably coupled to one another by magnetic means, said magnetic means having a magnetic strength which exceeds the maximum sustained torque which said motor develops during normal operation, so as to transfer torque without irrruption during normal operation of the motor, but which permits slippage to occur between said first and second members of said coupling to prevent a torque above said maximum safe torque from being applied to said drive means by said motor to thereby protect the drive means from being damaged by the motor in the event of a sudden change of speed of the movable load and the drive means.

* * * * *